No. 857,813. PATENTED JUNE 25, 1907.
R. LINDNER.
VALVE GEARING AND MOTION FOR LOCOMOTIVES.
APPLICATION FILED MAY 14, 1906.
5 SHEETS—SHEET 1.
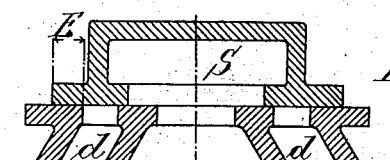
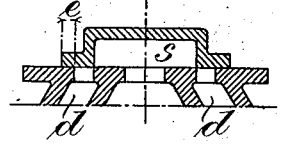
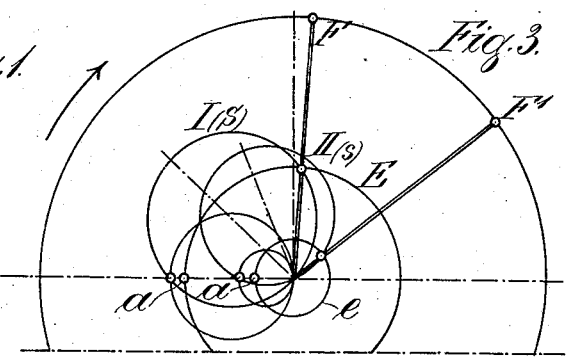
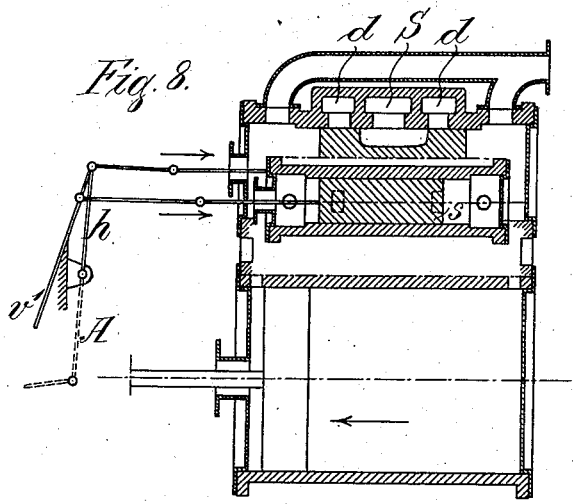
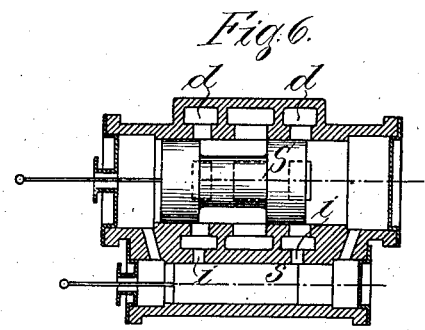
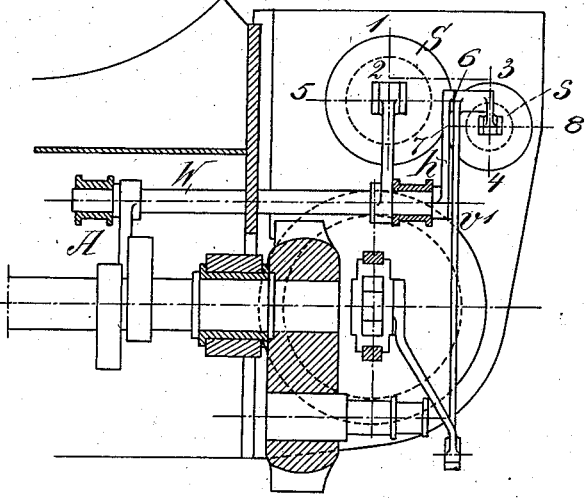
Witnesses:
Inventor:
Robert Lindner

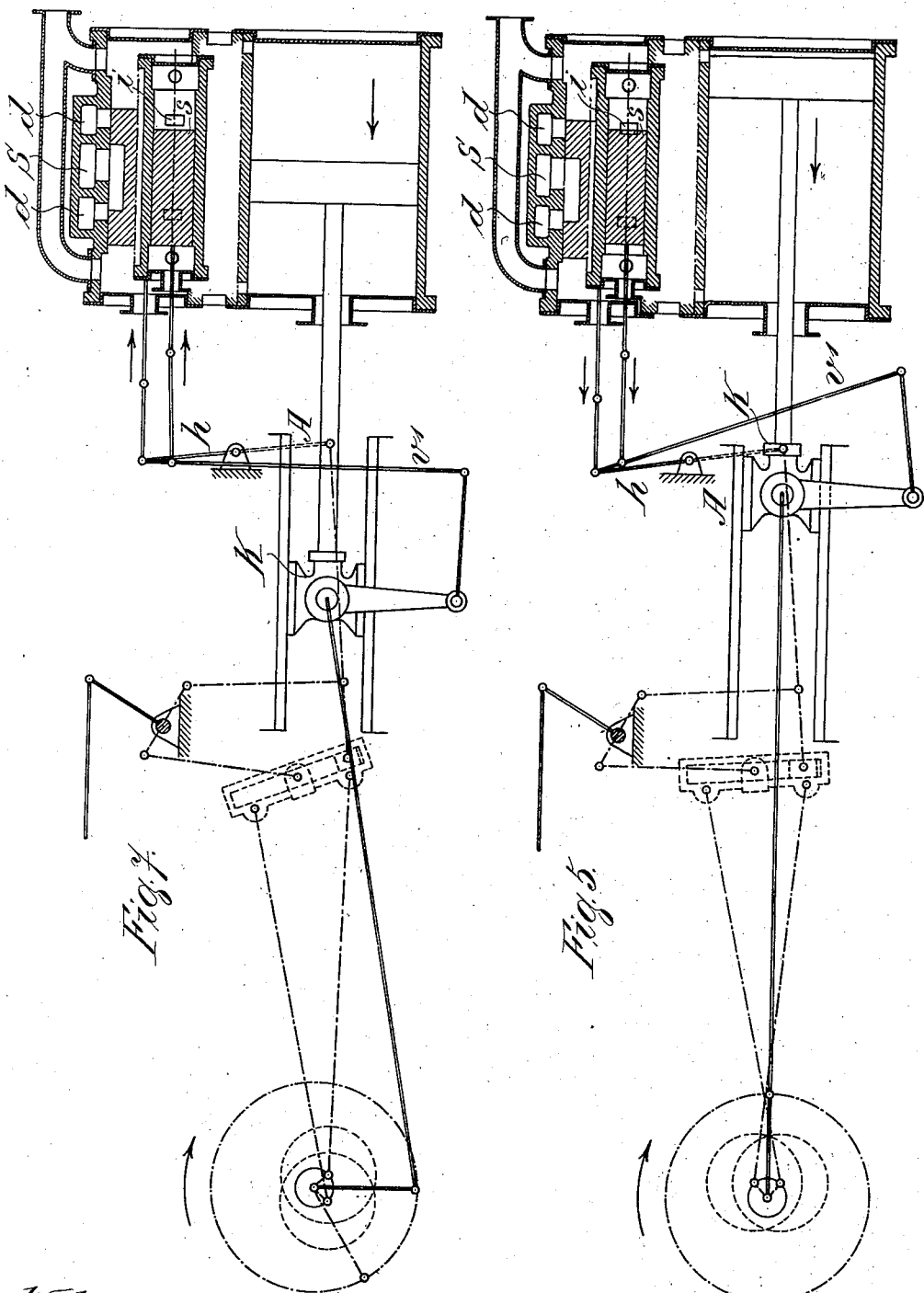

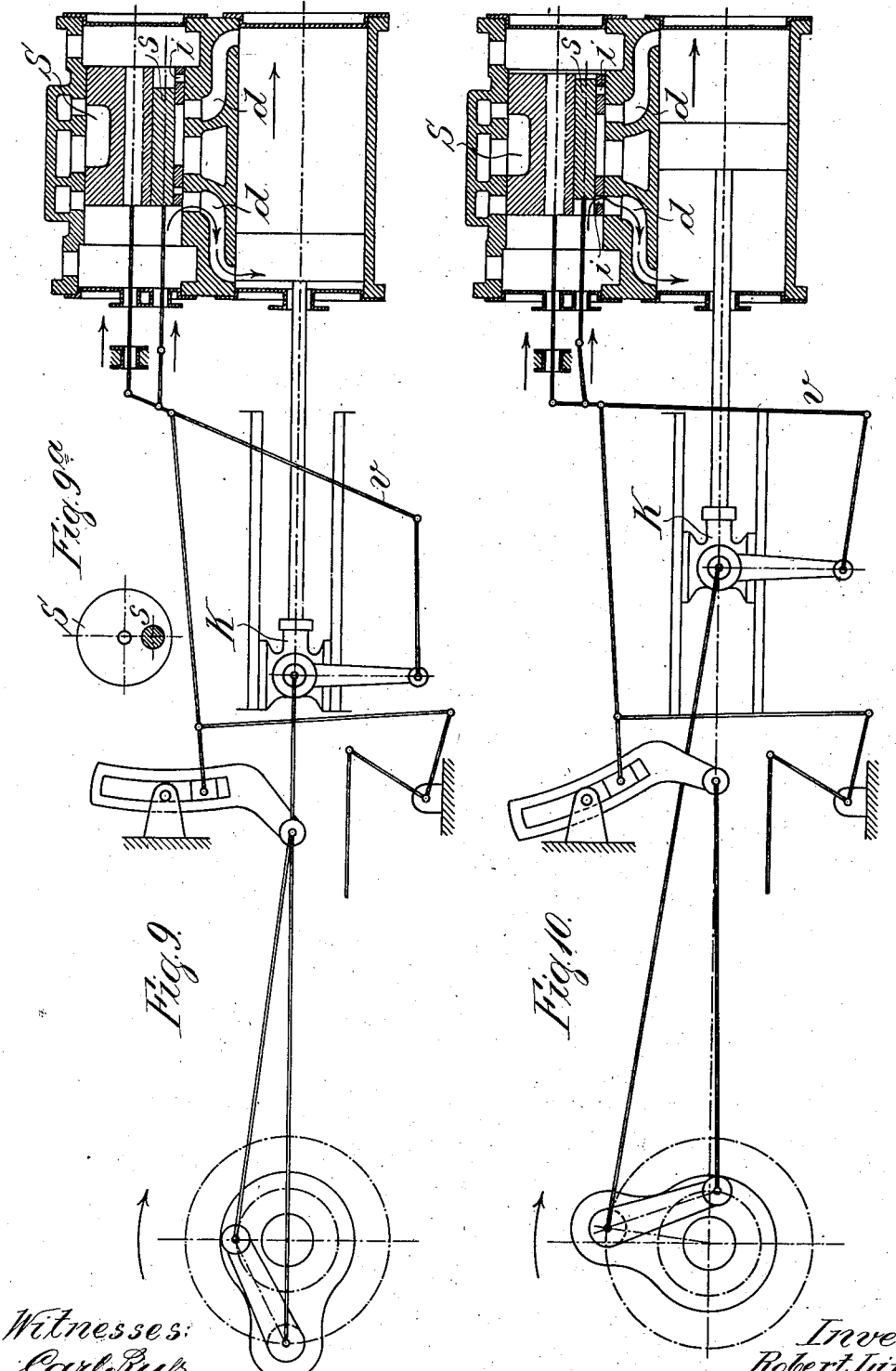

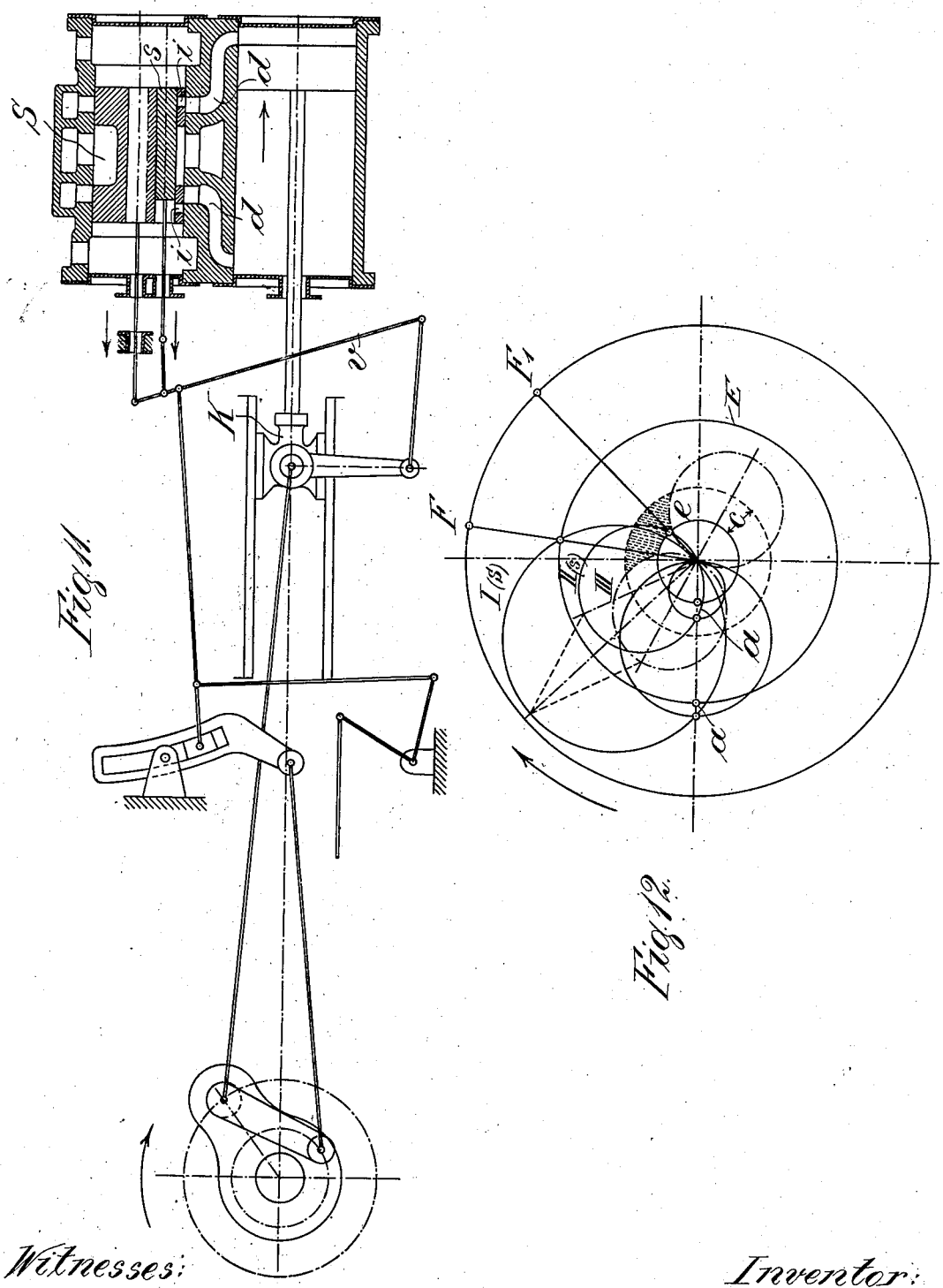

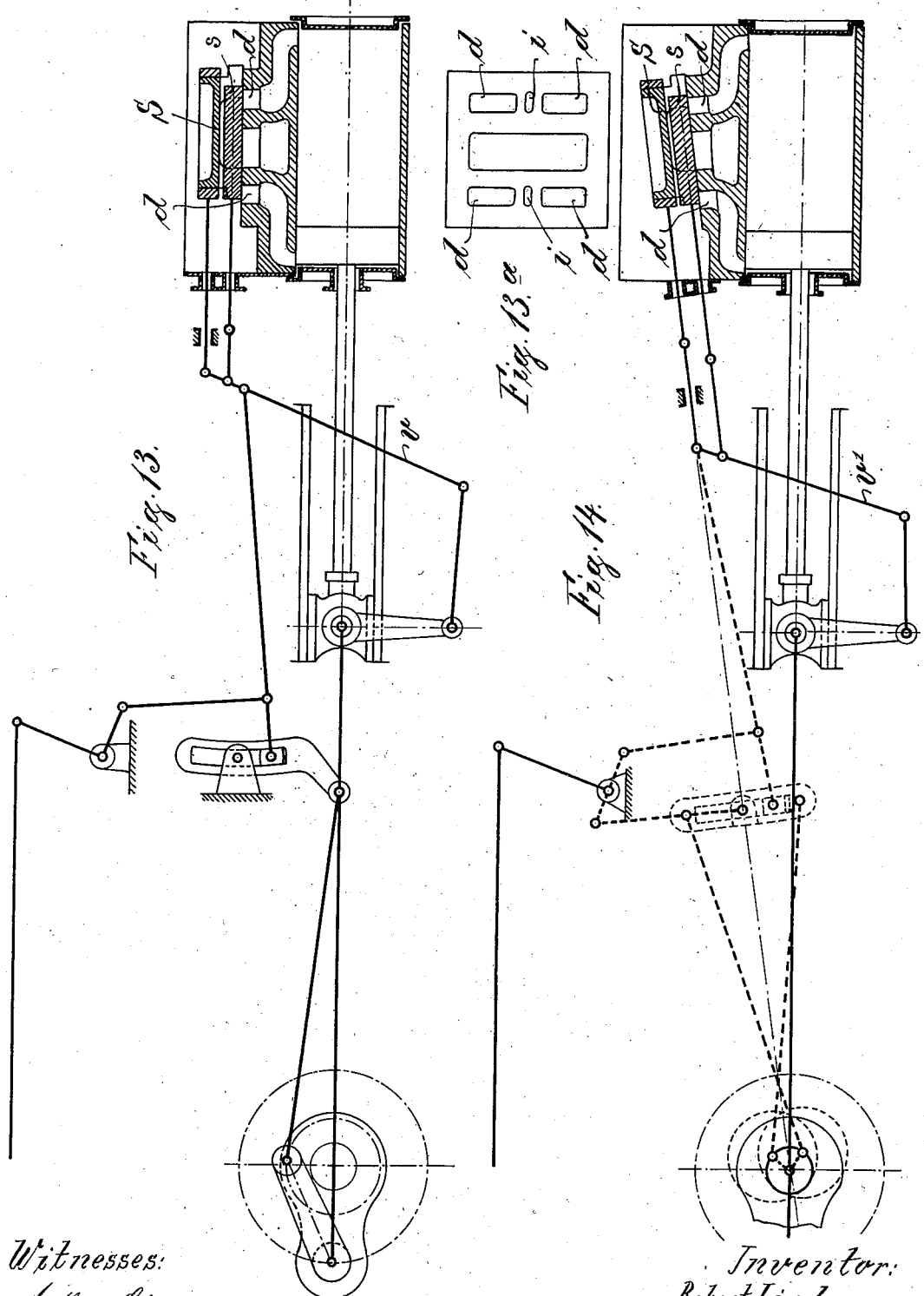

UNITED STATES PATENT OFFICE.

ROBERT LINDNER, OF DRESDEN, GERMANY.

VALVE GEARING AND MOTION FOR LOCOMOTIVES.

No. 857,813.  Specification of Letters Patent.  Patented June 25, 1907.

Application filed May 14, 1906. Serial No. 316,685.

*To all whom it may concern:*

Be it known that I, ROBERT LINDNER, a subject of the King of Saxony, and a resident of No. 2 Borsbergstrasse, Dresden, in the Kingdom of Saxony, German Empire, have invented certain new and useful Improvements in Valve Gearings and Motions for Locomotives, of which the following is an exact specification.

My invention relates to a new and improved valve motion for steam engines and locomotives, and is more especially applicable to twin cylinder engines and locomotives. As is known the setting of the driving cranks in such engines at 90 degrees with regard to one another requires the adjustment of the valve motion to give charges of steam which shall be as large as possible, for instance steam is admitted over about 0,8 of the length of the piston stroke, in order to obtain a good starting of the engine. The starting is sometimes effected by one piston whose corresponding crank is sufficiently distant from the dead center, the steam admission to the other piston being cut off by its distributing valve. For the running of the locomotive however considerably smaller charges of steam are sufficient and the cut off takes place about 0,5 of the piston stroke. Therefore I have provided a valve motion in which the greatest charge of steam corresponds to a cut off at half stroke, but in which the maximum slide valve travel hitherto used in locomotives having a cut off at about 0,8 of the stroke. In both cases moreover the length of the link remains unaltered. Owing to this arrangement there is provided a greater range of adjustment for the same amount of cut off and steam distribution than heretofore.

According to this invention in a valve motion arranged as described the larger charges of steam necessary for starting the engine represented by a cut off later than half stroke, are obtained by admitting a supplementary charge to the cylinder.

In order to make my invention clear, I refer to the accompanying drawing in which:

Figures 1 & 2 are longitudinal sections of slide valves to be used in accordance with my invention, Fig. 3 is a diagram for showing the corresponding slide valve movements. Fig. 4 is an end view of a steam engine showing one improved arrangement of valve and valve gear. Fig. 5 illustrates an arrangement of valve motion according to this invention partly in diagrammatical manner and partly in elevation and longitudinal section, the sections on the valves being taken on the lines 1, 2, 3, 4 of Fig. 4. Fig. 6 is a section taken through the valves upon the lines 5, 6, 7, 8 of Fig. 4. Figs. 7 & 8 are similar views to Fig. 5 but showing the valves and gearing in different positions. Figs. 9 to 11 illustrate another form of valve motion arranged according to my invention the views being partly diagrammatical and partly in longitudinal section and side elevation. Fig. 12 is a valve diagram corresponding to the arrangement seen in Figs. 9 to 11, and Figs. 13 & 14 are diagrams of two further modifications of my invention. Fig. 13ª represents a face view of the slide-valve showing the admission ports $d$ and $i$.

According to my invention the large or main slide valve S (Fig. 1) has a large outer lap E and distributes the steam while running. This valve S is connected with a second and smaller slide valve $s$ (Fig. 2) having a small outer lap $e$. This small second slide valve is hereinafter designated as the supplementary admission slide valve. In the ordinary construction the admission ports $d$ (Fig. 1) are in turn kept open up to about 0,8 of the stroke by the main valve S, whereas according to my invention the supplementary slide valve $s$ is provided for the purpose of obtaining a cut off at about 0,8 of the stroke, and I connect it with the gearing, while the main valve cuts off the admission ports always at about half stroke, so that a supplementary charge of steam is admitted into the cylinder from half stroke to almost the end of the stroke by the supplementary slide valve. Compare the slide valve diagram Fig. 3 in which the circles 1 (S) and 11 ($s$) represent the paths of the slide valves S and $s$, which are adjusted both on the same line $a$ for lead (that is to say the admission port openings are equally opened); E and $e$ are the outer laps of the main and the small slide valve respectively. From this diagram it can be seen that the admission port is cut off by the main slide valve at the crank position F, whereas the admission port is cut off by the small supplementary slide valve at a later time, namely at F' and also at that place the main slide valve having a small inner lap begins to open the steam exit. Such a supplementary admission slide valve can be employed with any valve gear or link motion.

In valve motions provided with a single eccentric such as Heusinger's link motion or in valve motions having no eccentric such as Joy's link motion the lead angle, being independent of the outer valve lap, is constantly equal to zero. The lead of the slide valve is in this case produced by the lever $v$ (Fig. 13) hereinafter called the lead lever, operated by the guided crosshead of the piston rod in accordance with the outer lap of the slide valve. For this purpose the supplementary admission slide valve having the small outer lap is connected by pivotal points with the lead lever $v$ of the main valve having a large outer lap in such way that the stroke of the supplementary admission slide valve is smaller than the stroke of the main valve by the difference between the outer valve laps of both the valves. The outer lap of the supplementary admission valve is chosen so large, that it only cuts off at 0,8 of the piston stroke or even later, or preferably up to that piston position at which the main valve opens the cylinder to exhaust.

In link motions having two eccentrics (Stephenson, Allan, Gooch) the eccentric angles must be enlarged for the purpose of obtaining earlier cut off in accordance with the enlargement of the outer valve lap for example from about 30 degrees to about 45 degrees. In both cases the same eccentric disks may be used. As however the supplementary admission slide valve having a small lap needs the diminishing of the lead angle (usually amounting to 30 degrees) a special lead lever $v'$ for the purpose of diminishing the lead of the supplementary admission slide valve (Fig. 14) is employed, the lower end of which lever as is the case with the lead lever of the single eccentric motion for example of Heusinger's link motion is moved by the cross head and the upper end of which is moved by the joint of the valve connecting rod directly jointed to the main valve rod, or to a point running parallel with this joint (Fig. 4).

Constructional forms for the connection of the small supplementary admission slide valve $s$ with the large main slide valve $S$ are illustrated by Figs. 4 to 11. Figs. 4 to 8 illustrate the Allan link motion being provided with a weigh shaft $w$ for transmitting motion from the gear A (Fig. 4) to the main piston valve $S$. Alongside the latter the supplementary piston slide valve $s$ is arranged and is operated by a special lever $h$ parallel to the main valve lever and by a lead lever $v'$ suspended from said lever $h$ and connected with the cross head K. In Fig. 5 the crank is on its dead center and, in the normal section Fig. 6 both the slide valves having equal linear lead, have opened the steam admission ports $d$ and $i$ for the beginning of the piston stroke, the operating device, for instance the cross head being in its end position, whereas in Fig. 7 (almost vertical crank position) the main slide valve $s$ cuts off the steam port $d$ and the valve $s$ keeps open the admission port $i$ as is necessary for starting the engine. This supplementary admission is finished in the position of the crank indicated by dotted line in Fig. 7, in which, as will be understood from Fig. 8, the main valve opens the port $d$ for the steam exhaust.

Figs. 9 to 11 illustrate in a diagrammatical manner Heusinger's link motion with a piston valve. The supplementary admission valve $s$ is arranged within the main valve $S$ and connected with the lead lever $v$ of the latter valve. For enabling the steam to pass to the piston of the engine after the closing of the main valve, the main valve $S$ is provided with passages $i$ which are covered and uncovered by the supplementary valve $s$. When the crank is on the dead center, as in Fig. 9, the main slide valve has moved from its middle position by an amount represented by $E+a$ and the supplementary valve by an amount $e+a$. Therefore the valves at the lefthand end are in the same straight line. When the crank is rotated to the vertical position just prior to the position seen in Fig. 10 the supplementary valve is not opening the steam admission ports, however it will open the latter near that crank position and before the main valve shuts off. In Fig. 10 the cut off by the main valve $S$ is illustrated. In the crank position as illustrated by Fig. 11 that is to say at 0,8 to 0,9 of the piston stroke the supplementary valve cuts off the supplementary admission of steam and the main valve permits the steam to exhaust. The crank of the other cylinder then continues the rotary motion at the corresponding crank position. The supplementary slide valve needs no exhaust opening as the exhaust is effected solely by the main valve.

The steam distribution with the valve operating device is in its end position, and the supplementary admission slide valve arranged in the main valve is illustrated by the diagram Fig. 12. I (S) designates the main slide valve circle, 11 ($s$) the supplementary admission slide valve circle; E and $e$ are the circles of the outer lap, and $a$ the linear lead of both the valves. Furthermore III designates the circle representing the reciprocal path of both the valves and $c$ the length of the passage $i$ in the main valve $S$. It will be understood therefore that the steam admission is cut off by the main valve at the crank position F. The supplementary admission commences as seen from the hatched part of Fig. 12 just before F and finishes at F'. As compared with a valve motion without a supplementary slide valve and cutting off at 0.8 of the stroke the valve motion having a supplementary slide valve is arranged to cut off at latest at about half stroke and that with a link having the same length as heretofore. Therefore the improved valve motion gives finer gradations of adjustment than the first mentioned valve motion for any earlier cut off (for example a cut off at 0,2 of the stroke.) By this larger displacement from the most unfavorable steam distribution at the dead center improved steam distribution results for the various grades of cut off and furthermore it results therefrom that the engine can run with the gear set for a still earlier cut off than hitherto. As furthermore the effort of the engine diminishes with the diminishing of the charge of steam the steam cylinders are enlarged in a suitable manner in accordance with the diminishing of the largest charge of steam which is given by a cut off about 0,8 to about 0,5 of the stroke. Owing to the arrangement according to my invention the valve motion provided with a supplementary slide valve permits the employment of larger cylinders than hitherto used for the purpose of diminishing the consumption of steam by employing a higher degree of expansion. The supplementary slide valve is arranged to uncover the admission port only when the engine is starting, and that between a quarter to a half rotation of the fly wheel or, if a locomotive, of the driving wheel. The supplementary charge of steam slowly fills the cylinders at a pressure the cylinders being relatively large, compared with the size of the ports the steam admitted being sufficient for the purpose of starting the engine or of driving the driving wheels. During the further rotation of the wheels the steam admitted by the main slide valve is then acting and when the piston speed increases, only a very small supplementary supply of steam is admitted to the cylinder owing to the supplementary valve uncovering only small inlet ports and owing to the resistance of the reacting expanding steam pressure.

Having thus fully described the nature of my invention, what I desire to secure by Letters Patent of the United States is:—

1. A valve-gear especially suited for twin cylinder engines, comprising a main slide valve (S), means for operating said valve, a supplementary slide-valve (s) provided with small port holes (i) in direct connection to cylinder, means for operating the supplementary valve, in order to permit an additional steam charge to enter the cylinder through port-holes (i) after main slide-valve (S) has closed the steam admission ports (d) for the purpose of giving a supplementary charge to cylinder when the engine is starting.

2. A valve-gear especially suited for twin cylinder engines, comprising a main slide valve (S), means for operating said valve, a supplementary slide-valve (s) provided with small port holes (i) in direct connection to cylinder, means for operating the supplementary valve, a swinging lever (v,) connected to both slide valves and means for operating same in order to permit an additional steam-charge to enter the cylinder through port-holes (i) after main slide valve (S) has closed the steam admission ports (d) for the purpose of giving a supplementary charge to cylinder when the engine is starting.

3. A valve-gear especially suited for twin cylinder engines, comprising a main-slide-valve (S), means for operating said valve, a supplementary slide-valve (s) provided with small port holes (i) in direct connection to cylinder, means for operating the supplementary valve, a swinging lever (v) connected to both slide-valves, means for operating same, a suspended connection between the other end of this swinging lever and the cross-head in order to permit an additional steam-charge to enter the cylinder through port-hole (i) after main-slide-valve (S) as has closed the steam admission ports (d) for the purpose of giving a supplementary charge to cylinder when the engine is starting.

4. A valve-gear especially suited for twin-cylinder engines, comprising a main-slide-valve (S) means for operating said valve, a supplementary slide-valve (s) stationary arranged on a special face in order to permit an additional steam charge to enter the cylinder through port holes (i) after main slide valve (S) has closed the steam admission ports (d) for the purpose of giving a supplementary charge to cylinder when the engine is starting.

5. A valve-gear especially suited for twin-cylinder engines, comprising a main-slide-valve (S), means for operating said valve, a supplementary slide-valve (s), a chamber within the main slide-valve (S) for the supplementary slide-valve (s) to work in, means for operating the valves in order to permit an additional steam-charge to enter the cylinder through port-hole (i) after the main slide valve (S) has closed its steam admission ports (d) for the purpose of giving a supplementary charge to cylinder when the engine is starting.

In witness whereof I have hereunto set my hand in the presence of two witnesses.

ROBERT LINDNER.

Witnesses:
 CHEMNITZ H. SCHILLING,
 PAUL ARRAS.